US012614832B1

(12) United States Patent
Zhu et al.

(10) Patent No.: US 12,614,832 B1
(45) Date of Patent: Apr. 28, 2026

(54) TRANSPARENT ANTENNA SYSTEM FOR REDUCING VISUAL ARTIFACTS

(71) Applicant: Meta Platforms Technologies, LLC, Menlo Park, CA (US)

(72) Inventors: Jiang Zhu, Cupertino, CA (US); Yasuo Morimoto, Cupertino, CA (US); Eric Fest, Seattle, WA (US); Boon Shiu, Palo Alto, CA (US); Nicholas Daniel Trail, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 516 days.

(21) Appl. No.: 18/171,970

(22) Filed: Feb. 21, 2023

Related U.S. Application Data

(60) Provisional application No. 63/376,918, filed on Sep. 23, 2022.

(51) Int. Cl.
| | |
|---|---|
| *H01Q 1/12* | (2006.01) |
| *G02B 27/01* | (2006.01) |
| *H01Q 1/27* | (2006.01) |
| *H01Q 1/38* | (2006.01) |

(52) U.S. Cl.
CPC ....... *H01Q 1/1271* (2013.01); *G02B 27/0172* (2013.01); *H01Q 1/273* (2013.01); *H01Q 1/38* (2013.01); *G02B 2027/012* (2013.01); *G02B 2027/0178* (2013.01)

(58) Field of Classification Search
CPC ........ H01Q 1/1271; H01Q 1/273; H01Q 1/38; G02B 27/0172; G02B 2027/012; G02B 2027/0178
See application file for complete search history.

(56) References Cited

U.S. PATENT DOCUMENTS

| | | | |
|---|---|---|---|
| 2009/0051620 A1* | 2/2009 | Ishibashi | H01Q 9/16 |
| | | | 343/897 |
| 2024/0258690 A1* | 8/2024 | Iimura | H01Q 21/065 |

\* cited by examiner

*Primary Examiner* — David E Lotter
(74) *Attorney, Agent, or Firm* — Foley & Lardner LLP

(57) ABSTRACT

A transparent antenna system is disclosed that reduces or removes optical artifacts when used in connection with devices through which a user can view content. For example, the transparent antenna system utilizes a transparent conductive mesh (e.g., metal mesh) that includes randomized patterns of apertures. Thus, when such meshes are overlaid on an LED display (e.g., as with a pair of AR glasses), the randomized patterns of apertures reduce or eliminate the occurrence of optical artifacts. Moreover, the transparent antenna system can maintain a minimum average pitch over the transparent conductive mesh such that performance levels of the transparent antenna system is also maintained. Various other methods, systems, and computer-readable media are also disclosed.

20 Claims, 8 Drawing Sheets

PRIOR ART

600

602

Form a substrate

604

Dispose a transparent conductive antenna on the substrate, wherein the transparent conductive antenna includes an arrangement of apertures, wherein the arrangement of apertures is formed in an at least partially randomized pattern, and wherein the arrangement of apertures maintains at least a minimum average pitch width

TRANSPARENT ANTENNA SYSTEM FOR REDUCING VISUAL ARTIFACTS

CROSS REFERENCE TO RELATED APPLICATION

This application claims the benefit of U.S. Provisional Application No. 63/376,918, filed 23 Sep. 2022, the disclosure of which is incorporated, in its entirety, by this reference.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1A:
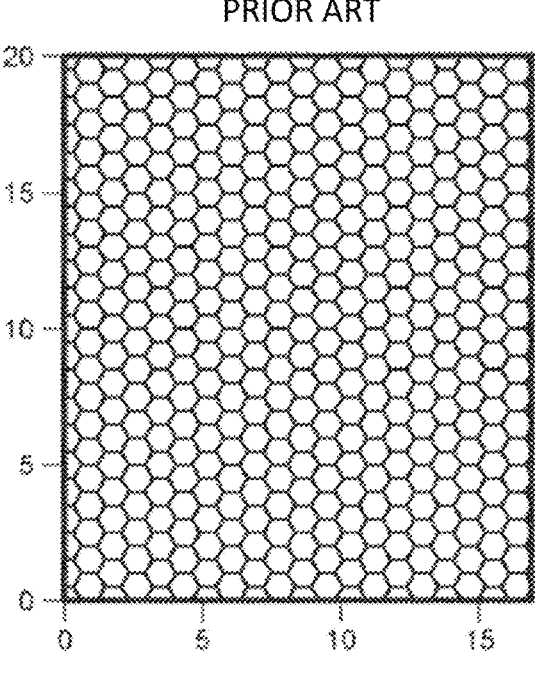
FIGS. 1A-1D illustrate various mesh patterns in accordance with one or more implementations.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION OF EXEMPLARY IMPLEMENTATIONS

The present disclosure is generally directed to a system that reduces haze and other optical artifacts that may occur when transparent conductive meshes are implemented on devices with grid-based (e.g., LED) displays. For instance, because LED displays include grids of pixels, if a similar grid-shaped mesh is laid over the top of the display's LED grid, haze, scattering, starburst, or other optical artifacts may occur. These artifacts may be highly visible and distracting to users of augmented reality (AR) glasses, smartwatches, or other devices that may use a transparent metal-mesh conductive antenna.

The implementations described herein may provide a transparent conductive mesh that has randomized patterns of apertures or opening in the mesh. These randomized patterns may include different shapes, different sizes, or randomized elements (e.g., different placements of vertices and/or segment lengths). When such meshes are overlaid on an LED display, optical artifacts such as haze, scattering, starburst, etc., may be avoided or at least greatly reduced. The implementations described herein may not only randomize the patterns of the grid shapes but may also maintain a minimum average pitch over the mesh, even if the sizes of individual grid shapes are larger or smaller. Maintaining this minimum average pitch may ensure that a minimum level of conductivity or resistivity is provided for the mesh to continue to function as an antenna.

As a result, the implementations described herein may provide a transparent conductive mesh with randomized patterns that may include grid apertures of different shapes and sizes, while also providing a minimum average pitch across the mesh to ensure that a minimum level of conductivity is provided for any antennas formed using the transparent conductive mesh. Such implementations may reduce or eliminate the optical artifacts that may otherwise result when applying a transparent mesh to a grid-based (e.g., LED) display.

Moreover, the implementations described herein may solve problems that arise in connection with placing a transparent antenna on a camera. For example, smaller devices that include a camera (e.g., smart phones, head-mounted devices) may also include a transparent antenna mounted on top of the camera. As such, pictures are taken by the camera though the transparent antenna. In this configuration, however, the metal mesh of the transparent antenna can create visible light diffraction in images captured by the camera. As such, the implementations described herein can generate an image calibration matrix that effectively filters the light diffraction out of the image data resulting in photographs that are free from the visible light diffraction caused by the transparent antenna placed over the camera within the device.

Features from any of the implementations described herein may be used in combination with one another in accordance with the general principles described herein. These and other implementations, features, and advantages will be more fully understood upon reading the following detailed description in conjunction with the accompanying drawings and claims.

In one or more implementations, descriptions of the transparent antenna system herein can reference various terms. For example, as used herein the term "transparent conductive antenna" can refer to any antenna material capable of conducting electricity that allows light to pass through-enough that objects behind the material can be seen. In one or more implementations, such a transparent conductive antenna can transmit and/or receive electronic signals. In at least one implementation a transparent conductive antenna can be, for example, a monopole antenna, a dipole antenna, a loop antenna, a slot antenna, or other type of antenna.

As used herein, a "substrate" can be any surface on which other materials are positioned or deposited. When used in connection with one or more transparent antenna, a substrate can include a layer of glass, plastic, or other material through which electromagnetic waves may radiate. As used herein, the "pitch" or "pitch width" of an area of mesh (e.g., metal mesh) can refer to a sum of the aperture or opening size and the diameter or gauge size of the wires that make up the mesh. As used herein, an "aperture" can refer to an opening or negative space in an area of conductive mesh.

The following will provide with reference to FIGS. 1-6, detailed descriptions of a transparent antenna system that reduces visual artifacts such as haze, scattering, and star-bursts. As discussed above, regular and/or uniform mesh aperture openings in a transparent conductive antenna can generate optical artifacts-particularly when the transparent conductive antenna is disposed on a lens such as those incorporated in augmented reality glasses or head-mounted virtual reality devices. In more detail, as shown in FIG. 1A, an existing mesh pattern can include repeated hexagons. When used in connection with a light source, the mesh pattern illustrated in FIG. 1A can generate a hexagonal starburst pattern of light(s) in the user's field of view. This hexagonal starburst pattern of light(s) can be extremely distracting for the user, while simultaneously lessening the quality of the user's AR/VR experience. Similarly, as shown in FIG. 1C, another existing mesh pattern can include a grid. This grid pattern can create a crosshair pattern of light(s) in the user's field of view. The optical artifacts generated by these typical mesh patterns can be bright to the point that the user cannot see anything but the optical artifacts within areas of view inside certain devices where the transparent conductive antenna is in use.

Figure 1B:
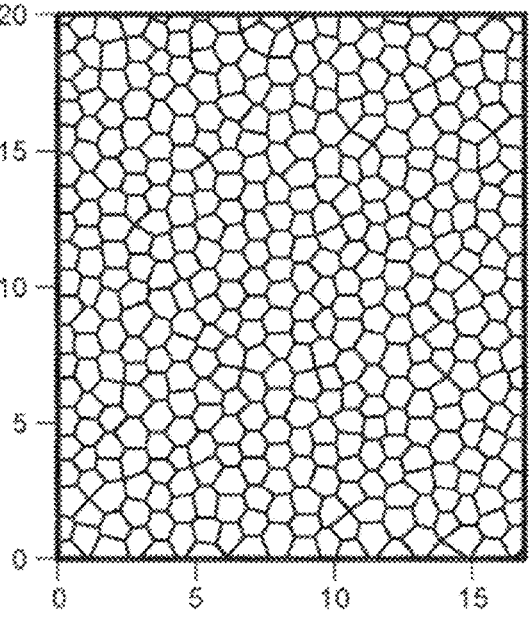
Figure 1C:
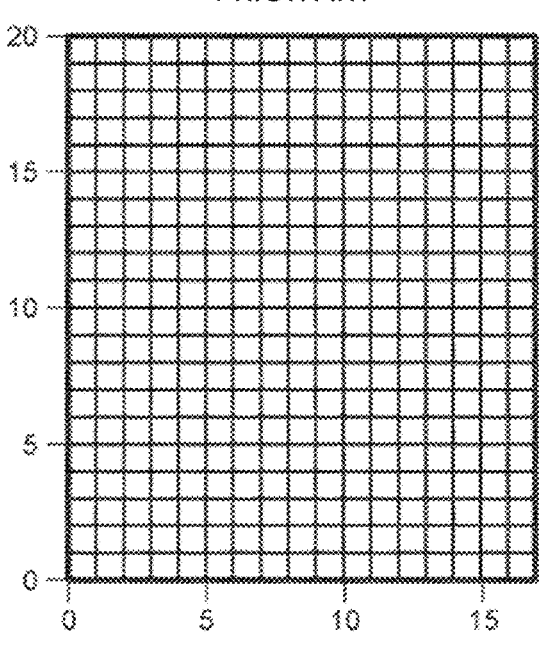
Figure 1D:
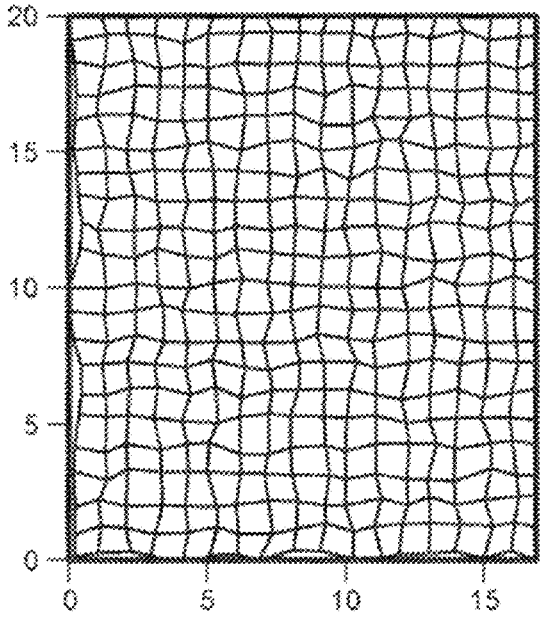

To eliminate these optical artifacts, the transparent conductive antenna described herein can include a metal mesh with randomized patterns and arrangements of mesh aper-tures or openings. For example, as shown in FIG. 1B, the transparent conductive antenna described herein can include a hexagon mesh with a randomized pattern of apertures. Similarly, as shown in FIG. 1D, the transparent conductive antenna described herein can include a square mesh with a randomized pattern of aperture openings.

In one or more implementations, the randomized patterns of apertures discussed herein can have the same average pitch as their respective regular patterns. For example, the randomized hexagonal pattern shown in FIG. 1B can have the same average pitch width of the metal mesh, in 0, 60, and 120 degrees. Similarly, the randomized square pattern shown in FIG. 1D can have the same average pitch width of the metal mesh, in 0 and 90 degrees. In at least one implementation, the pitch width of the randomized patterns may be important because it can define the resistivity of the metal mesh pattern. Thus, at least in some cases, there may be no change in resistivity of the randomized patterns shown in FIGS. 1B and 1D (e.g., relative to FIGS. 1A and 1C respectively) because the same average pitch width in each randomized pattern is maintained.

Figures 2, 3:
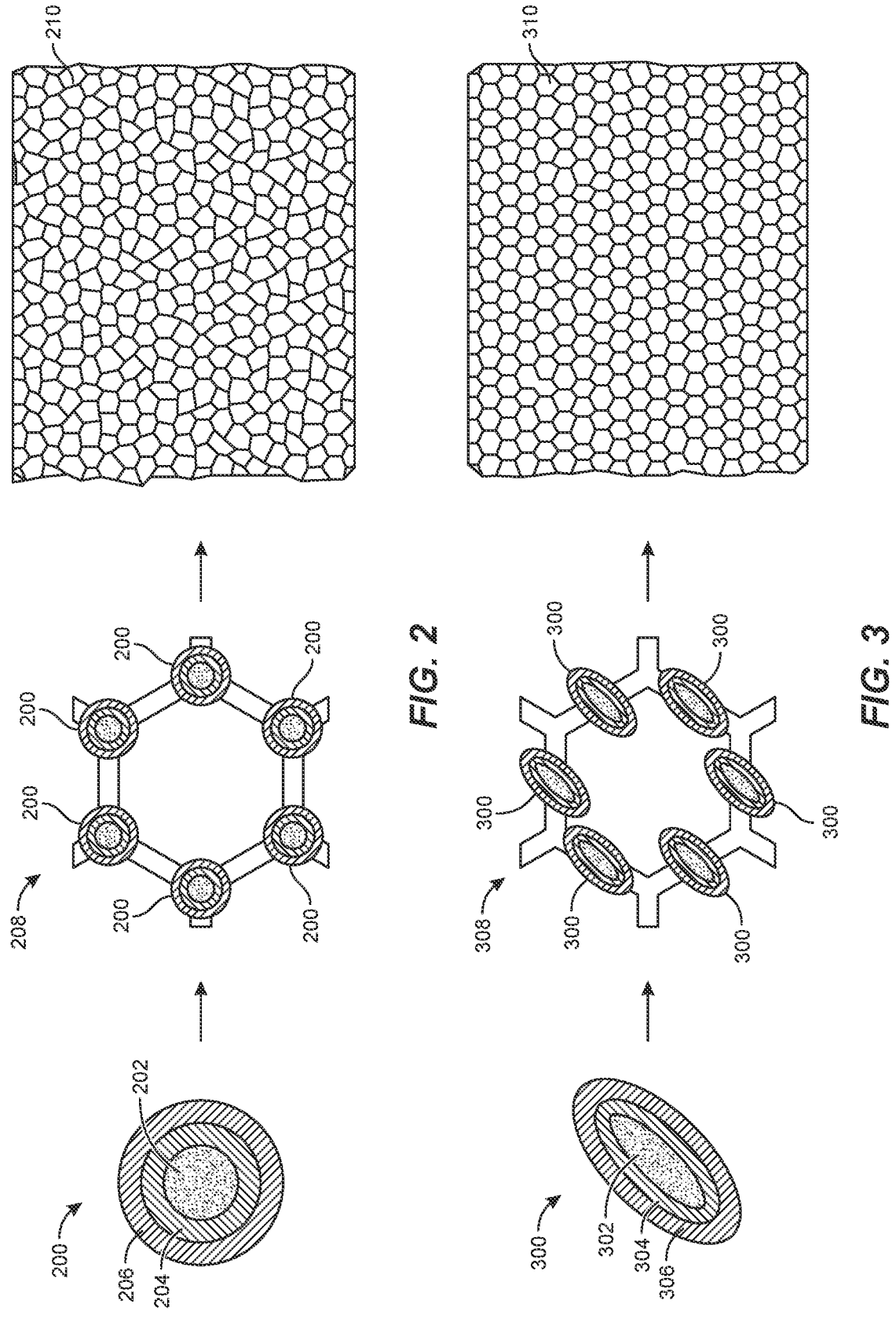
FIG. 2 illustrates an example method for randomizing vertices of a hexagonal mesh pattern in accordance with one or more implementations.
FIG. 3 illustrates an example method for randomizing lines of a hexagonal mesh pattern in accordance with one or more implementations.

In one or more implementations, the systems described herein can include a method for generating randomized patterns, such as those illustrated above with reference to FIGS. 1B and 1D. For example, as shown in FIG. 2, the randomization method can assume that each vertex of a metal mesh pattern of vertices 208 is randomly located within a normal distributed circle 200. In at least one implementation, for example, the method can include gen-erating at least 68% of the vertices of the pattern of vertices 208 within a first sigma circle 202, at least 95.4% of the vertices of the pattern of vertices 208 within a second sigma circle 204, and at least 99.7% of the vertices of the pattern of vertices 208 within a third sigma circle 206. As demonstrated by the metal mesh area 210, with each hexagon vertex randomized by this method, the corresponding hexa-gon may also be randomized. Despite this, the overall pitch width of the metal mesh area 210 remains the same on average as in the normal hexagon pattern (e.g., such as shown in FIG. 1A), and as such does not affect the overall resistivity of the metal mesh.

In additional implementations, the systems described herein can also include a method for randomizing the pitch as well as the vertices. For example, as shown in FIG. 3, the method can randomize each edge or line of the metal mesh pattern with a certain directional bias. To illustrate, the method can apply an elliptical distribution 300 (e.g., with elliptical distributions 302, 304, and 306 similar to those discussed above with regard to the normal distributed circle 200) to a hexagonal pattern of lines 308 such that two points are moved in a synchronized manner. In at least one imple-mentation, the result of this application is that the overall mesh pitch width remains the same on average with no effect to the overall resistivity of the metal mesh with the metal mesh area 310.

In some implementations, the minimum average pitch width may vary in at least two different portions of the transparent conductive antenna. In some cases, the random-ized pattern may be formed using a randomized distribution of vertices to generate a randomized angle pattern. In some examples, the randomized pattern of apertures may be formed using a randomized distribution of edges to generate a randomized pitch pattern for the apertures. In some embodiments, the apertures in the arrangement of apertures may be formed according to a specified shape. That shape may be a rectangle, a diamond, a hexagon, a pentagon, an octagon, or other specified shape.

Although FIGS. 1B, 1D, 2, and 3 show a hexagonal or grid arrangement of mesh apertures, other arrangements are possible. For example, in some implementations the arrangement of apertures of the transparent conductive antenna may include at least two different specified shapes. In some embodiments, the minimum average pitch width may vary over the length and/or width of the transparent conductive antenna. In some examples, the minimum aver-age pitch width may vary over the transparent conductive antenna from about 50 µm to about 1 mm. In some cases, the randomized pattern may include patterns that are random-ized in both angle and pitch. In some embodiments, this randomization may be implemented using a probability density function (PDF).

Figure 4:
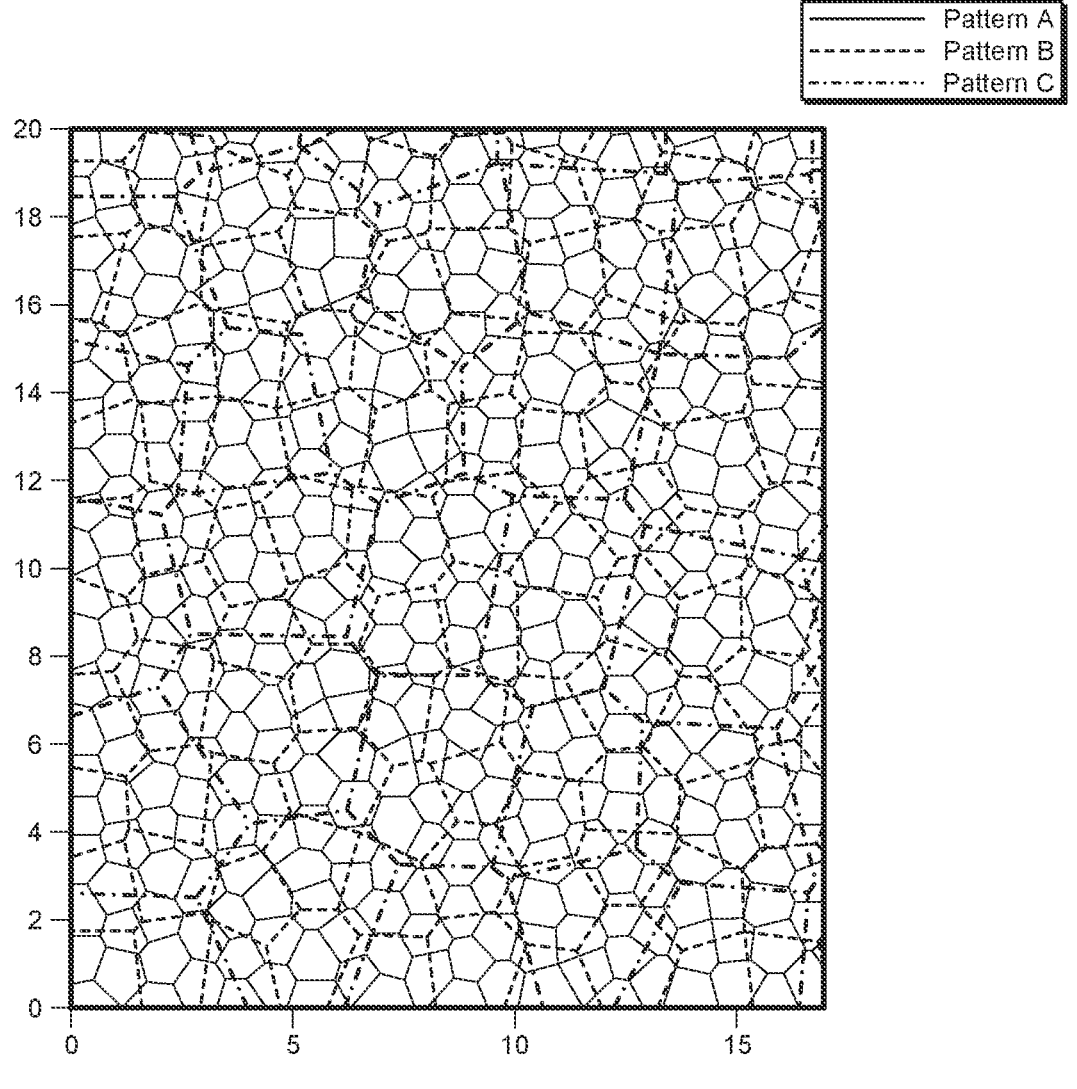
FIG. 4 illustrates how resistivity of a transparent conductive antenna can be affected by the average pitch of a pattern of the metal mesh therein in accordance with one or more implementations.

In one or more implementations, the resistivity of a transparent conductive antenna can be affected by the aver-age pitch of the pattern of the metal mesh therein. For example, as shown in FIG. 4, a Pattern A (e.g., represented by the solid lines) can have an average pitch of 50 µm, while a Pattern B (e.g., represented by the dashed lines) can have an average pitch of 100 µm and a Pattern C (e.g., represented by the dot-dash-dot lines) can have an average pitch of 200 µm. In at least one implementation, the increase in pitch of each of the patterns corresponds to an increase in resistivity. For example, a transparent conductive antenna may include metal mesh with areas or layers of metal mesh with different pitches. In response to this, the transparent conductive antenna may have areas of reduction in haze and increase in transmissivity where user visibility is important. Similarly, the transparent conductive antenna may have areas of reduc-tion in resistivity where current carrying capacity is desired. In at least one implementation, a region with randomized pitch can also achieve a similar effect.

5

Figure 5A:
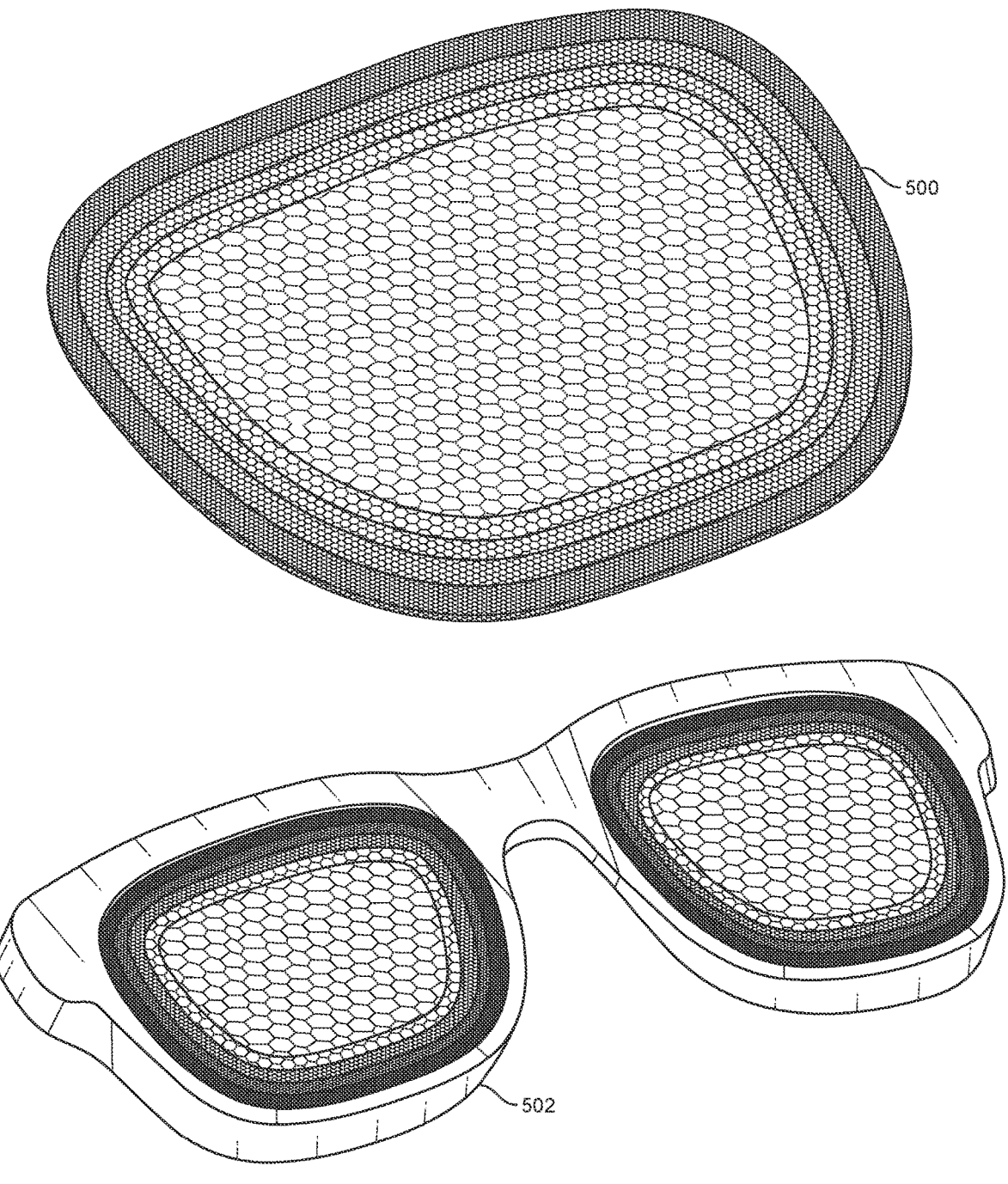
FIG. 5A illustrates how the transparent antenna system can be incorporated into one or more lenses in accordance with one or more implementations.

As mentioned above, the transparent antenna system can be incorporated into optical lenses of various augmented reality or virtual reality devices. For example, as shown in FIG. 5A, the transparent antenna system can be incorporated into an optical lens 500. Moreover, the lens 500 can be included in, for example, a pair of AR glasses 502. In one or more implementations, the transparent antenna system can be included in the optical lens 500 as one layer of many other layers with different pitches. In at least one implementation, the transparent antenna system can be included in only one area of the optical lens 500 (e.g., an area where high visibility is important).

Figure 5B:
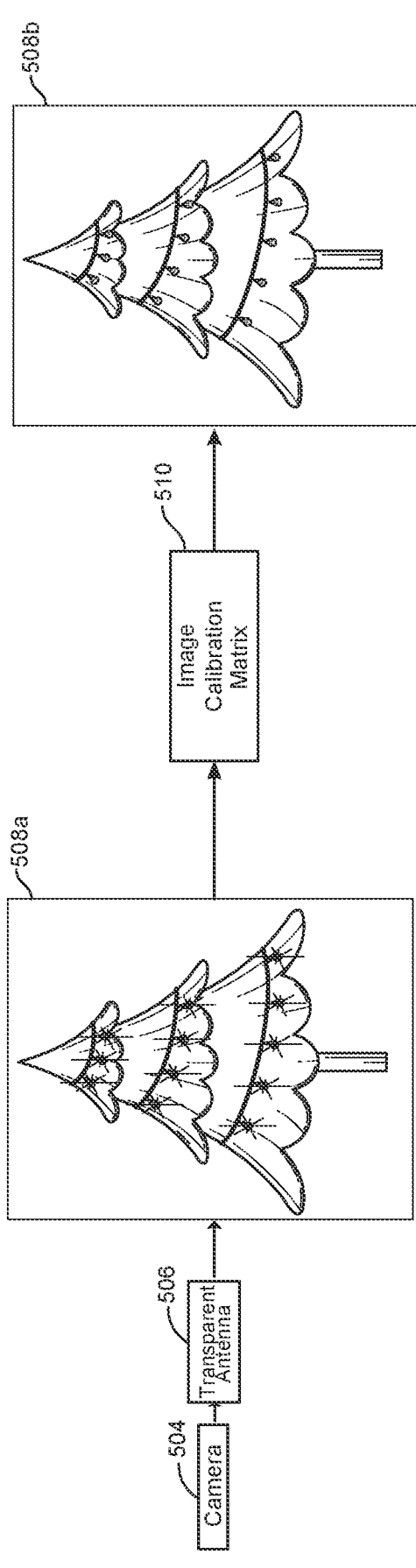
FIG. 5B illustrates how the transparent antenna system can remove visible light diffraction in connection with photographs taken by a camera overlaid with a transparent antenna in accordance with one or more implementations.

As mentioned above, devices such as the AR glasses 502 shown in FIG. 5A can include one or more cameras. Due to the small size and/or limited surface area of such devices, one or more transparent antennas may be placed over the one or more cameras. For example, as shown in FIG. 5B, a camera 504 of a device may be overlaid with a transparent antenna 506. In this configuration, however, the metal mesh of the transparent antenna 506 may create visible light diffraction in a photograph 508a captured by the camera 504. For example, as shown in FIG. 5B, the light diffraction in the photograph 508a can include a starburst pattern of light that can obscure areas of the photograph 508a. In order to filter or remove this light diffraction, the systems described herein can generate an image calibration matrix 510. By passing the photograph 508a through the image calibration matrix 510, the systems described herein can generate the calibrated photograph 508b without the light diffraction or light scattering caused by the transparent antenna 506.

In one or more implementations, the systems described herein can generate the image calibration matrix 510 as an inversed matrix, which is pre-calculated based on the condition of the metal mesh within the transparent antenna. For example, the systems described herein can pre-calculate the image calibration matrix 510 with a series of pictures $[X_1]$ . . . $[X_n]$ taken by the camera 504 without the transparent antenna 506, and a series of pictures $[Y_1]$ . . . $[Y_n]$ taken by the camera 504 overlaid with the transparent antenna 506. For each picture $[X_n]$, the systems described herein can generate a brightness matrix $[B_n(X_n)]$, where $[B_n]$ is a function of $[X_n]$, and assuming that $[B_n]$ can also be used for $[Y_n]$. Then, for each corresponding pair of pictures $[X_n]$, $[Y_n]$, the systems described herein can generate a scattering matrix $[S_n]$ that represents the light diffraction present in $[Y_n]$. For example, the systems described herein can generate the scattering matrix $[S_n]$ as:

$$[S_n]=[B_n(X_n)]^{-1}[X_n]^{-1}[Y_n]$$

After determining scattering matrices $[S_1]$ through $[S_n]$, the systems described herein can generate a generalized scattering matrix $[S_g]$. For example, the systems described herein can determine the generalized scattering matrix $[S_g]$ as the average of scattering matrices $[S_1]$ through $[S_n]$ in connection with metal mesh conditions associated with the transparent antenna 506 such as mesh pitch, orientation, shape, aperture ratio, mesh width, mesh thickness, base materials, and so forth. Additionally or alternatively, the systems described herein can generate the generalized scattering matrix $[S_g]$ by using machine learning in connection with the scattering matrices $[S_1]$ through $[S_n]$ and the metal mesh condition. Ultimately, the systems described herein can determine the generalized scattering matrix $[S_g]$ as:

$$[B_n(X_n)][S_g]=[X_n]^{-1}[Y_n]$$

6

As such, the calibrated photograph 508b can be represented as:

$$[X'_n]=[Y_n][S_g]^{-1}[B_n(Y_n)]^{-1}$$

With the generalized scattering matrix $[S_g]$ determined, the systems described herein can calibrate pictures taken by the camera 504 in real time. For example, in response to the camera 504 capturing a new picture $[Y_n]$ in real time, the systems described herein can generate the brightness matrix $[B_n]^{-1}$ based on $[Y_n]$. The systems described herein can further multiply $[B_n]^{-1}$ and $[Y_n]$ by the inverted generalized scattering matrix $[S_g]^{-1}$, thereby determining $[Y_n][S_g]^{-1}[B_n(Y_n)]^{-1}$ (e.g., the image calibration matrix 510). As shown above, the result of this calculation is the calibrated image $[X'_n]$. In this way, the systems described herein can calibrate a picture that includes light diffraction resulting from the metal mesh of a transparent antenna overlaid on a camera that took the picture such that the light diffraction is no longer present in the calibrated picture.

As mentioned above, FIG. 6 is a flow diagram of an exemplary method 600 for manufacturing the transparent antenna system. In at least one example, each of the steps shown in FIG. 6 may represent an algorithm whose structure includes and/or is represented by multiple sub-steps, examples of which may be provided in greater detail below.

Figure 6:
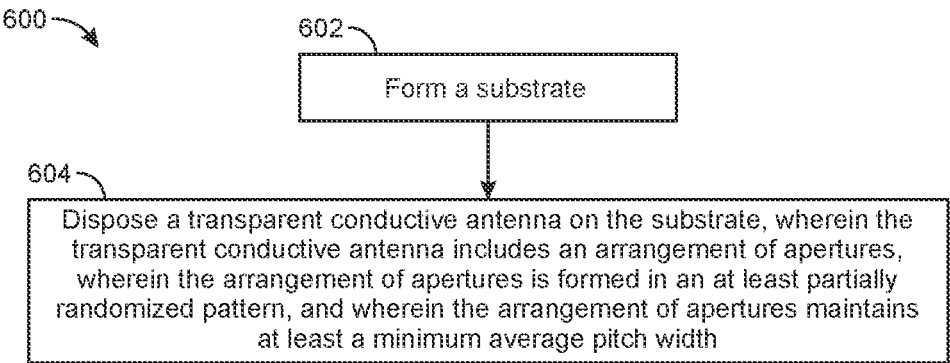
FIG. 6 illustrates a flow diagram of steps taken in a method of manufacturing the transparent antenna system in accordance with one or more implementations.

As illustrated in FIG. 6, at step 602 the method for generating the transparent antenna system can form a substrate. For example, as discussed above, the transparent antenna system can include a substrate, such as glass, so that the system may be incorporated into various devices. In one or more implementations, the substrate includes a material through which electromagnetic waves may pass.

As further shown in FIG. 6, at step 604 the method for generating the transparent antenna system can display a transparent conductive antenna on the substrate. For example, the transparent conductive antenna can include an arrangement of apertures, wherein the arrangement of apertures is formed in an at least partially randomized pattern, and wherein the arrangement of apertures maintains at least a minimum average pitch width. To illustrate, the at least partially randomize pattern can maintain one or more of various shapes, such as rectangles, diamonds, hexagons, pentagons, or octagons.

As such, the transparent antenna system discussed herein overcomes several of the problems common to existing antenna systems. For example, when existing antenna systems are incorporated into transparent applications—such as lenses through which a user views content-existing antenna systems generate distracting optical artifacts (e.g., starbursts, scattering, haze). To remove these optical artifacts and improve the viewing experience of the user, the transparent antenna system introduces metal mesh within the system that includes randomized patterns of apertures. Moreover, to maintain a minimum level of conductivity or resistivity within the mesh, the transparent antenna system also maintains a minimum average pitch over the mesh (e.g., even though the individual apertures within the mesh vary). Thus, the transparent antenna system effectively removes optical artifacts while maintaining performance levels.

EXAMPLE IMPLEMENTATIONS

Example 1: A transparent antenna system for reducing or removing visual artifacts. For example, the system may include a substrate and a transparent conductive antenna disposed on the substrate, wherein the transparent conductive antenna includes an arrangement of apertures, wherein the arrangement of apertures is formed in an at least partially randomized pattern, and wherein the arrangement of apertures maintains at least a minimum average pitch width.

Example 2: The system of Example 1, wherein the minimum average pitch width varies in at least two different portions of the transparent conductive antenna.

Example 3: The system of any of Examples 1 and 2, wherein the at least partially randomized pattern is formed using a randomized distribution of vertices to generate a randomized angle pattern.

Example 4: The system of any of Examples 1-3, wherein the at least partially randomized pattern is formed using a randomized distribution of edges to generate a randomized pitch pattern.

Example 5: The system of any of Examples 1-4, wherein the apertures in the arrangement of apertures are formed according to a specified shape.

Example 6: The system of any of Examples 1-5, wherein the specified shape for the apertures includes one or more vertices.

Example 7: The system of any of Examples 1-6, wherein one or more of the vertices of the specified shape are randomized while maintaining the specified shape.

Example 8: The system of any of Examples 1-7, wherein the specified shape comprises at least one of a rectangle, a diamond, a hexagon, a pentagon, or an octagon.

Example 9: The system of any of Examples 1-8, wherein the specified shapes are different sizes within the transparent conductive antenna, while maintain the minimum average pitch width.

Example 10: The system of any of Examples 1-9, wherein the arrangement of apertures of the transparent conductive antenna includes at least two different specified shapes.

Example 11: The system of any of Example 1-10, wherein the minimum average pitch width varies over the transparent conductive antenna.

Example 12: The system of any of Examples 1-11, wherein the minimum average pitch width varies over the transparent conductive antenna from about 50 µm to about 1 mm.

Example 13: The system of any of Example 1-12, wherein the at least partially randomized pattern includes randomized patterns in both angle and pitch.

In some examples, an optical lens can include a substrate, and a transparent conductive antenna disposed on the substrate, wherein the transparent conductive antenna includes an arrangement of apertures, wherein the arrangement of apertures is formed in an at least partially randomized pattern, and wherein the arrangement of apertures maintains at least a minimum average pitch width.

A computer-implemented method for generating a transparent antenna system. For example, the method may include forming a substrate and disposing a transparent conductive antenna on the substrate, wherein the transparent conductive antenna includes an arrangement of apertures, wherein the arrangement of apertures is formed in an at least partially randomized pattern, and wherein the arrangement of apertures maintains at least a minimum average pitch width.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 700 in FIG. 7) or that visually immerses a user in an artificial reality (such as, e.g., virtual-reality system 800 in FIG. 8). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 7:
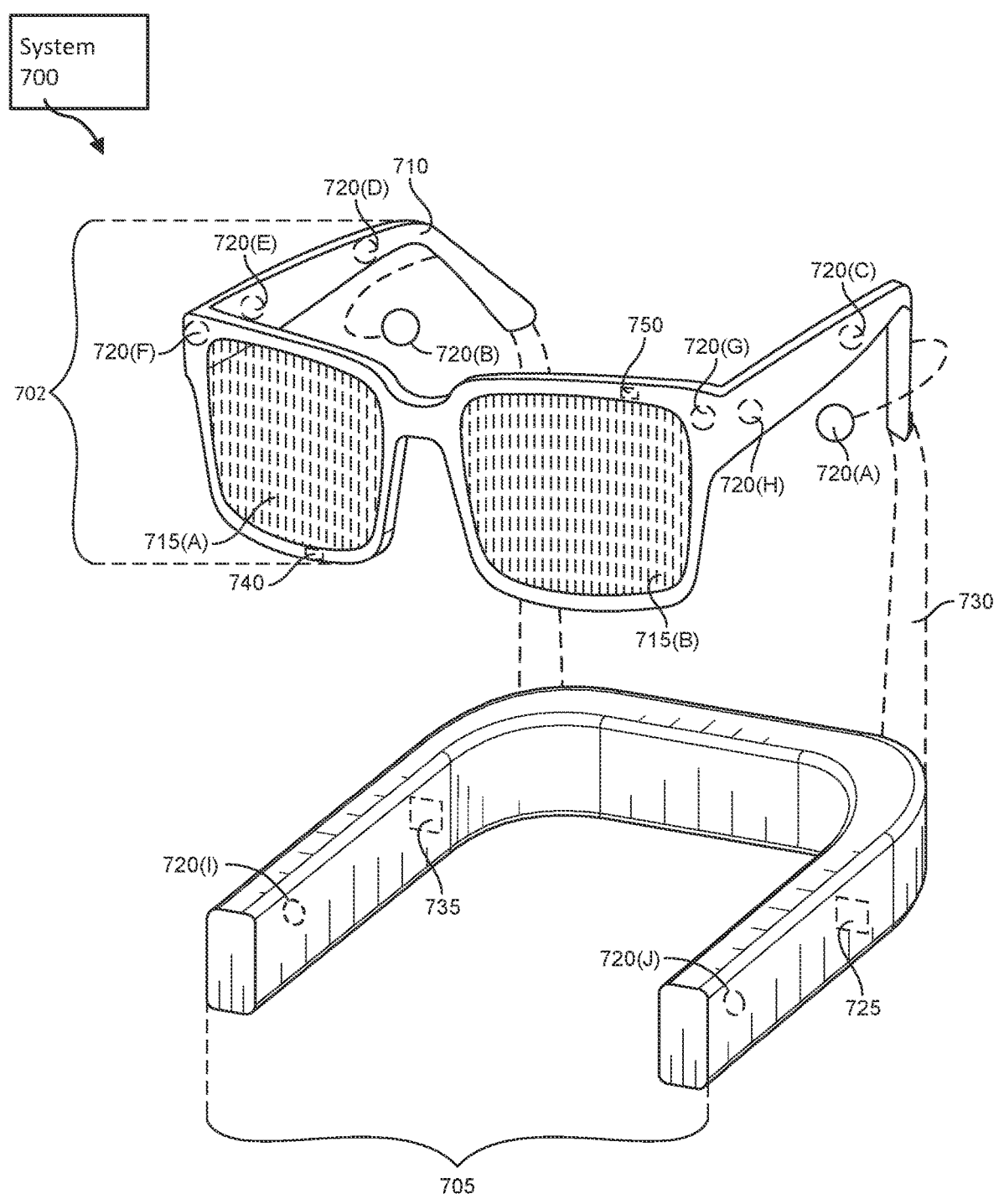
FIG. 7 illustrates exemplary augmented-reality glasses that may be used in connection with implementations of this disclosure.
Figure 8:
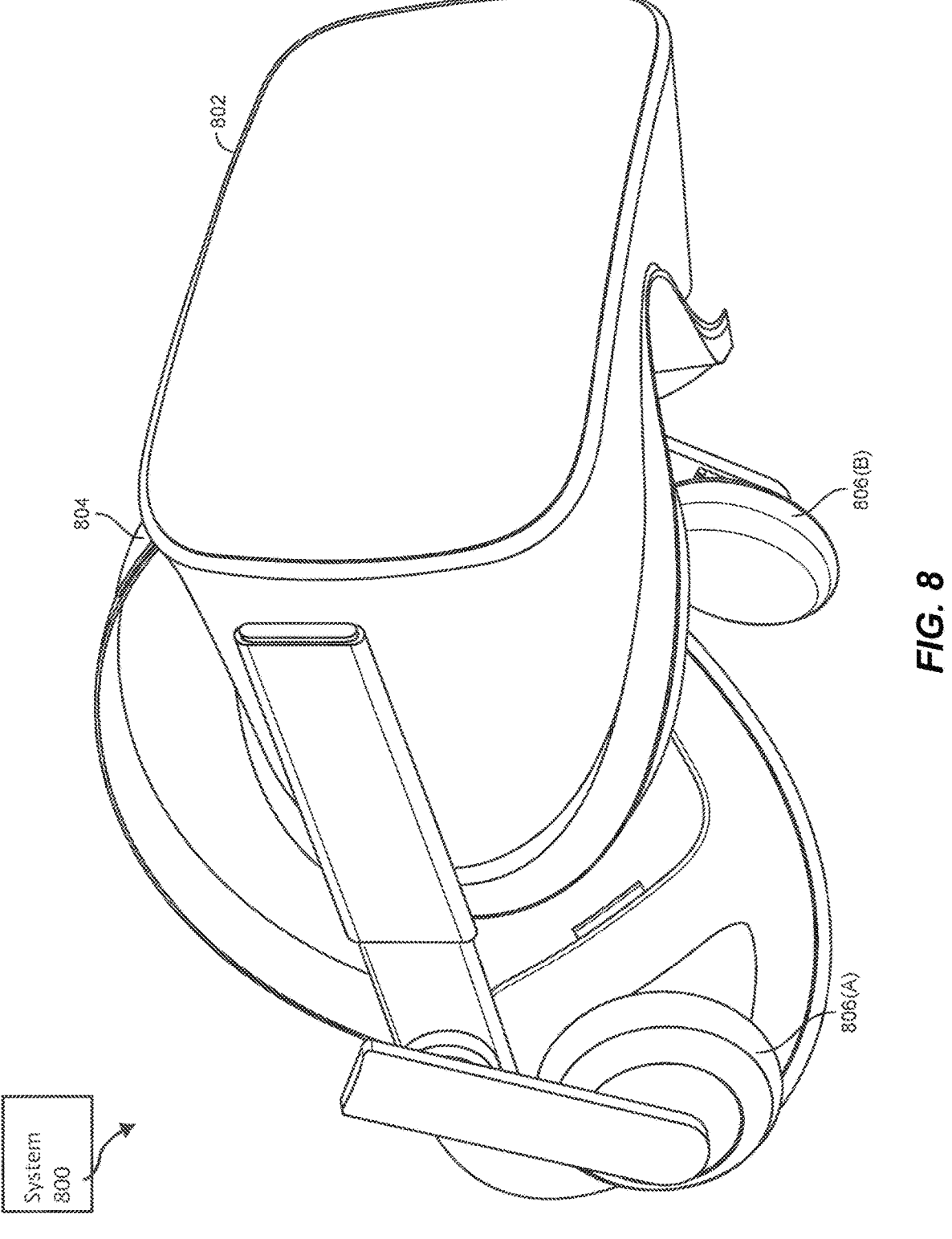
FIG. 8 illustrates an exemplary virtual-reality headset that may be user in connection with implementations of this disclosure.

Turning to FIG. 7, augmented-reality system 700 may include an eyewear device 702 with a frame 710 configured to hold a left display device 715(A) and a right display device 715(B) in front of a user's eyes. Display devices 715(A) and 715(B) may act together or independently to present an image or series of images to a user. While augmented-reality system 700 includes two displays, embodiments of this disclosure may be implemented in augmented-reality systems with a single NED or more than two NEDs.

In some embodiments, augmented-reality system 700 may include one or more sensors, such as sensor 740. Sensor 740 may generate measurement signals in response to motion of augmented-reality system 700 and may be located on substantially any portion of frame 710. Sensor 740 may represent one or more of a variety of different sensing mechanisms, such as a position sensor, an inertial measurement unit (IMU), a depth camera assembly, a structured light emitter and/or detector, or any combination thereof. In some embodiments, augmented-reality system 700 may or may not include sensor 740 or may include more than one sensor. In embodiments in which sensor 740 includes an IMU, the IMU may generate calibration data based on measurement signals from sensor 740. Examples of sensor 740 may include, without limitation, accelerometers, gyroscopes, magnetometers, other suitable types of sensors that detect motion, sensors used for error correction of the IMU, or some combination thereof.

In some examples, augmented-reality system 700 may also include a microphone array with a plurality of acoustic transducers 720(A)-720(J), referred to collectively as acoustic transducers 720. Acoustic transducers 720 may represent transducers that detect air pressure variations induced by sound waves. Each acoustic transducer 720 may be configured to detect sound and convert the detected sound into an electronic format (e.g., an analog or digital format). The microphone array in FIG. 7 may include, for example, ten acoustic transducers: 720(A) and 720(B), which may be designed to be placed inside a corresponding ear of the user, acoustic transducers 720(C), 720(D), 720(E), 720(F), 720 (G), and 720(H), which may be positioned at various locations on frame 710, and/or acoustic transducers 720(I) and 720(J), which may be positioned on a corresponding neckband 705.

In some embodiments, one or more of acoustic transducers 720(A)-(J) may be used as output transducers (e.g., speakers). For example, acoustic transducers 720(A) and/or 720(B) may be earbuds or any other suitable type of headphone or speaker.

The configuration of acoustic transducers 720 of the microphone array may vary. While augmented-reality system 700 is shown in FIG. 7 as having ten acoustic transducers 720, the number of acoustic transducers 720 may be greater or less than ten. In some embodiments, using higher numbers of acoustic transducers 720 may increase the amount of audio information collected and/or the sensitivity and accuracy of the audio information. In contrast, using a lower number of acoustic transducers 720 may decrease the computing power required by an associated controller 750 to process the collected audio information. In addition, the position of each acoustic transducer 720 of the microphone array may vary. For example, the position of an acoustic transducer 720 may include a defined position on the user, a defined coordinate on frame 710, an orientation associated with each acoustic transducer 720, or some combination thereof.

Acoustic transducers 720(A) and 720(B) may be positioned on different parts of the user's ear, such as behind the pinna, behind the tragus, and/or within the auricle or fossa. Or there may be additional acoustic transducers 720 on or surrounding the ear in addition to acoustic transducers 720 inside the ear canal. Having an acoustic transducer 720 positioned next to an ear canal of a user may enable the microphone array to collect information on how sounds arrive at the ear canal. By positioning at least two of acoustic transducers 720 on either side of a user's head (e.g., as binaural microphones), augmented-reality system 700 may simulate binaural hearing and capture a 3D stereo sound field around about a user's head. In some embodiments, acoustic transducers 720(A) and 720(B) may be connected to augmented-reality system 700 via a wired connection 730, and in other embodiments acoustic transducers 720(A) and 720(B) may be connected to augmented-reality system 700 via a wireless connection (e.g., a BLUETOOTH connection). In still other embodiments, acoustic transducers 720(A) and 720(B) may not be used at all in conjunction with augmented-reality system 700.

Acoustic transducers 720 on frame 710 may be positioned in a variety of different ways, including along the length of the temples, across the bridge, above or below display devices 715(A) and 715(B), or some combination thereof. Acoustic transducers 720 may also be oriented such that the microphone array is able to detect sounds in a wide range of directions surrounding the user wearing the augmented-reality system 700. In some embodiments, an optimization process may be performed during manufacturing of augmented-reality system 700 to determine relative positioning of each acoustic transducer 720 in the microphone array.

In some examples, augmented-reality system 700 may include or be connected to an external device (e.g., a paired device), such as neckband 705. Neckband 705 generally represents any type or form of paired device. Thus, the following discussion of neckband 705 may also apply to various other paired devices, such as charging cases, smart watches, smart phones, wrist bands, other wearable devices, hand-held controllers, tablet computers, laptop computers, other external compute devices, etc.

As shown, neckband 705 may be coupled to eyewear device 702 via one or more connectors. The connectors may be wired or wireless and may include electrical and/or non-electrical (e.g., structural) components. In some cases, eyewear device 702 and neckband 705 may operate independently without any wired or wireless connection between them. While FIG. 7 illustrates the components of eyewear device 702 and neckband 705 in example locations on eyewear device 702 and neckband 705, the components may be located elsewhere and/or distributed differently on eyewear device 702 and/or neckband 705. In some embodiments, the components of eyewear device 702 and neckband 705 may be located on one or more additional peripheral devices paired with eyewear device 702, neckband 705, or some combination thereof.

Pairing external devices, such as neckband 705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 700 may be provided by a paired device or shared between a paired device and an eyewear device, thus reducing the weight, heat profile, and form factor of the eyewear device overall while still retaining desired functionality. For example, neckband 705 may allow components that would otherwise be included on an eyewear device to be included in neckband 705 since users may tolerate a heavier weight load on their shoulders than they would tolerate on their heads. Neckband 705 may also have a larger surface area over which to diffuse and disperse heat to the ambient environment. Thus, neckband 705 may allow for greater battery and computation capacity than might otherwise have been possible on a stand-alone eyewear device. Since weight carried in neckband 705 may be less invasive to a user than weight carried in eyewear device 702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 705 may be communicatively coupled with eyewear device 702 and/or to other devices. These other devices may provide certain functions (e.g., tracking, localizing, depth mapping, processing, storage, etc.) to augmented-reality system 700. In the embodiment of FIG. 7, neckband 705 may include two acoustic transducers (e.g., 720(I) and 720(J)) that are part of the microphone array (or potentially form their own microphone subarray). Neckband 705 may also include a controller 725 and a power source 735.

Acoustic transducers 720(I) and 720(J) of neckband 705 may be configured to detect sound and convert the detected sound into an electronic format (analog or digital). In the embodiment of FIG. 7, acoustic transducers 720(I) and 720(J) may be positioned on neckband 705, thereby increasing the distance between the neckband acoustic transducers 720(I) and 720(J) and other acoustic transducers 720 positioned on eyewear device 702. In some cases, increasing the distance between acoustic transducers 720 of the microphone array may improve the accuracy of beamforming performed via the microphone array. For example, if a sound is detected by acoustic transducers 720(C) and 720(D) and the distance between acoustic transducers 720(C) and 720 (D) is greater than, e.g., the distance between acoustic transducers 720(D) and 720(E), the determined source location of the detected sound may be more accurate than if the sound had been detected by acoustic transducers 720(D) and 720(E).

Controller 725 of neckband 705 may process information generated by the sensors on neckband 705 and/or augmented-reality system 700. For example, controller 725 may process information from the microphone array that describes sounds detected by the microphone array. For each detected sound, controller 725 may perform a direction-of-arrival (DOA) estimation to estimate a direction from which the detected sound arrived at the microphone array. As the microphone array detects sounds, controller 725 may populate an audio data set with the information. In embodiments in which augmented-reality system 700 includes an inertial measurement unit, controller 725 may compute all inertial and spatial calculations from the IMU located on eyewear device 702. A connector may convey information between augmented-reality system 700 and neckband 705 and between augmented-reality system 700 and controller 725. The information may be in the form of optical data, electrical data, wireless data, or any other transmittable data form. Moving the processing of information generated by augmented-reality system 700 to neckband 705 may reduce weight and heat in eyewear device 702, making it more comfortable to the user.

Power source 735 in neckband 705 may provide power to eyewear device 702 and/or to neckband 705. Power source 735 may include, without limitation, lithium-ion batteries, lithium-polymer batteries, primary lithium batteries, alkaline batteries, or any other form of power storage. In some cases, power source 735 may be a wired power source. Including power source 735 on neckband 705 instead of on eyewear device 702 may help better distribute the weight and heat generated by power source 735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 800 in FIG. 8, that mostly or completely covers a user's field of view. Virtual-reality system 800 may include a front rigid body 802 and a band 804 shaped to fit around a user's head. Virtual-reality system 800 may also include output audio transducers 806(A) and 806(B). Furthermore, while not shown in FIG. 8, front rigid body 802 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 700 and/or virtual-reality system 800 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 700 and/or virtual-reality system 800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 700 and/or virtual-reality system 800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A system comprising:
a substrate; and
a transparent conductive antenna disposed on the substrate,
wherein the transparent conductive antenna includes a mesh comprising an arrangement of apertures,
wherein the arrangement of apertures is formed in an at least partially randomized pattern generated using a probability density function that includes at least one of a normal or an elliptical distribution, by randomizing at least one of vertices or edges of the mesh, and wherein the arrangement of apertures maintains at least a minimum average pitch width corresponding to a sum of an aperture and a diameter of a wire of the mesh.

2. The system of claim 1, wherein the minimum average pitch width varies in at least two different portions of the transparent conductive antenna.

3. The system of claim 1, wherein the at least partially randomized pattern is formed using a randomized distribution of vertices to generate a randomized angle pattern.

4. The system of claim 1, wherein the at least partially randomized pattern is formed using a randomized distribution of edges to generate a randomized pitch pattern.

5. The system of claim 1, wherein the apertures in the arrangement of apertures are formed according to a specified shape.

6. The system of claim 5, wherein the specified shape for the apertures includes one or more vertices.

7. The system of claim 6, wherein one or more of the vertices of the specified shape are randomized while maintaining the specified shape.

8. The system of claim 5, wherein the specified shape comprises at least one of a rectangle, a diamond, a hexagon, a pentagon, or an octagon.

9. The system of claim 5, wherein the specified shapes are different sizes within the transparent conductive antenna, while maintain the minimum average pitch width.

10. The system of claim 5, wherein the arrangement of apertures of the transparent conductive antenna includes at least two different specified shapes.

11. The system of claim 1, wherein the minimum average pitch width varies over the transparent conductive antenna.

12. The system of claim 11, wherein the minimum average pitch width varies over the transparent conductive antenna from about 50 μm to about 1 mm.

13. The system of claim 1, wherein the at least partially randomized pattern includes randomized patterns in both angle and pitch.

14. An optical lens comprising:

a substrate; and a transparent conductive antenna disposed on the substrate, wherein the transparent conductive antenna includes a mesh comprising an arrangement of apertures, wherein the arrangement of apertures is formed in an at least partially randomized pattern generated using a probability density function that includes at least one of a normal or an elliptical distribution, by randomizing at least one of vertices or edges of the mesh, and wherein the arrangement of apertures maintains at least a minimum average pitch width corresponding to a sum of an aperture and a diameter of a wire of the mesh.

15. The optical lens of claim 14, wherein the minimum average pitch width varies in at least two different portions of the transparent conductive antenna.

16. The optical lens of claim 14, wherein the at least partially randomized pattern is formed using a randomized distribution of vertices to generate a randomized angle pattern.

17. The optical lens of claim 14, wherein the at least partially randomized pattern is formed using a randomized distribution of edges to generate a randomized pitch pattern.

18. The optical lens of claim 14, wherein the apertures in the arrangement of apertures are formed according to a specified shape.

19. The optical lens of claim 18, wherein the specified shape for the apertures includes one or more vertices.

20. A method comprising:

forming a substrate; and disposing a transparent conductive antenna on the substrate, wherein the transparent conductive antenna includes a mesh comprising an arrangement of apertures, wherein the arrangement of apertures is formed in an at least partially randomized pattern generated using a probability density function that includes at least one of a normal or an elliptical distribution, by randomizing at least one of vertices or edges of the mesh, and wherein the arrangement of apertures maintains at least a minimum average pitch width corresponding to a sum of an aperture and a diameter of a wire of the mesh.

* * * * *